US008462436B2

(12) United States Patent
Tilford et al.

(10) Patent No.: US 8,462,436 B2
(45) Date of Patent: Jun. 11, 2013

(54) SOLAR PHOTON FILTER (76) Inventors: Arthur Robert Tilford, Yorba Linda, CA (US); Philip Frank Zimmermann, Long Beach, CA (US)

( * ) Notice: Subject to any disclaimer, the term of this patent is extended or adjusted under 35 U.S.C. 154(b) by 622 days.

(21) Appl. No.: 12/455,440

(22) Filed: Jun. 2, 2009

(65) Prior Publication Data
US 2009/0302240 A1    Dec. 10, 2009

Related U.S. Application Data (60) Provisional application No. 61/131,305, filed on Jun. 6, 2008.

(51) Int. Cl.
*G02B 5/136* (2006.01)
(52) U.S. Cl.
USPC ............ 359/577; 359/861; 359/634; 359/639
(58) Field of Classification Search
USPC ................. 359/850, 851, 853, 856, 857, 356, 359/584, 861, 634, 636, 639, 577; 136/246; 250/203.4
See application file for complete search history.

(56) References Cited

U.S. PATENT DOCUMENTS

| | | | |
|---|---|---|---|
| 3,792,916 A * | 2/1974 | Sarna | 359/577 |
| 4,487,478 A * | 12/1984 | Jackson | 359/601 |
| 4,556,599 A * | 12/1985 | Sato et al. | 428/216 |
| 4,886,348 A * | 12/1989 | Schmertz | 359/861 |
| 5,392,161 A * | 2/1995 | Weder et al. | 359/861 |
| 5,760,964 A * | 6/1998 | Malik | 359/634 |
| 6,331,914 B1 * | 12/2001 | Wood et al. | 359/584 |

FOREIGN PATENT DOCUMENTS
JP          357068801 A  *  4/1982 ..................... 359/857

* cited by examiner

*Primary Examiner* — Audrey Y Chang (57) ABSTRACT

This invention relates to a solar photon filter, hereafter known as the SPF, which is a combination band-pass filtering system consisting of a multiple set of cold or hot mirrors and infra-red absorbers set in a 360-degree or linear arrangement. The system removes almost all of the photons carried by waves having lengths longer than 1000 nm (nanometers)+/−100 nm, while passing almost all of the incoming photons carried by waves having lengths shorter than 1000 nm+/−100 nm and/or variations thereof. This is accomplished by positioning a set of cold or hot mirrors in constant optical track with the sun. Such an assembly of cold or hot mirrors allows solar photons carried by light to be split into two distinct bands of frequencies for use requiring such filtering separation.

6 Claims, 8 Drawing Sheets

SOLAR PHOTON FILTER

PRIOR APPLICATIONS

This application is based on provisional application No. 61/131,305 filed Jun. 6, 2008, and claim is made for the benefit of the filing date of the provisional application.

FIELD OF THE INVENTION

This invention relates to light modification, solar light filters, and broadband photon filters.

BACKGROUND OF THE INVENTION

Solar light is one of our natural resources which is available free or charge and which causes no negative environmental side effects when used. Light is shown to consist of particles when measured by some methods and waves when measured by other methods. The conclusion to this phenomena is that light is somehow both a wave and a particle—or that it's something else we can't quite visualize, which appears to us as one or the other depending on how we look at it.

Light is part of the electromagnetic spectrum that includes radio, television, gamma and x-rays. Light is a very small part of the vast electromagnetic spectrum where such phenomena are found. When measured as a wave, white light, as we see it, is composed of waves with physical lengths from about 800 nanometers to 400 nanometers. A nanometer is $1 \times 10^{-9}$ meter or 0.000000001 of a meter. Since the waves of light are in constant motion they can be considered as vibrations with an up and down movement when viewed from one perspective. When the light wave travels through one up and one down motion the movement is known as one cycle. The recurrence of these cycles during one second is known as the frequency of light. The waves of light travel at 300,000 meters per second which is known as "the speed of light" in a vacuum and thus a relationship between the frequency and the wavelength of light can be made.

The particles of light are known as "photons". A Photon is considered the smallest unit of light energy or electromagnetic radiation. Max Planck and Albert Einstein, Nobel Prize winners in physics, discovered that light, which usually travels in waves, sometimes behaves as if it were made up of a stream of individual small quantities called quanta or particles of energy. The term "photon" was coined by Gilbert Lewis in 1926.

The photon is one of the elementary particles of nature. Its interactions with electrons and atomic nuclei account for a great many of the features of matter, such as the existence and stability of atoms, molecules, and solids. In some respects a photon acts as a particle, for instance when detected by the crystalline structure of a light sensitive device in a camera. In other respects, a photon acts like a wave, as when passing through the optics in a camera.

Photons are produced by the collision of atoms when a bound electron moves from one orbital of high energy to another orbital with less energy. Photons have zero mass and zero electric charge, but they do carry energy. The energy of a photon can be transferred when a photon interacts with an electron within a crystalline structure such as that contained within a solar cell. Thus electricity can be created from energy produced when an electron moves within an atom to produce a photon which then travels elsewhere to finally impact another electron within a crystalline structure causing the new electron, independent of the first, to move creating an electric charge.

Atoms continuously emit photons due to their collisions with each other. The wavelength distribution of these photons is thus related to their absolute temperature with the probability of a photon being a certain wavelength determined by the temperature of the creating atom. The spectrum of such photons is normally peaked in the range between microwave and infra-red, but sufficiently hot objects (such as the surface of the Sun or a light bulb filament) will emit visible light as well. Normally, light is formed from a large number of photons, with the intensity related to the number of them.

Solar energy concentration devices are those appliances that can increase the amount of light or photonic energy generated at the sun by directing large volumes of continuous light into smaller volumes of space. We call this concentration of light. Light is not amplified, just concentrated. Such appliances include devices that make use of a lens or multiple lenses to focus an area of incoming light into a fine point. A refracting solar telescope makes use of several lenses to accomplish this task. On the other hand, lens-less systems make use of reflecting surfaces to focus an area of incoming light into a single fine point. The reflectors and/or lenses used in conventional collectors to focus the light beams are subject to heat production from the infra-red component of the incoming solar light and must be cooled or otherwise controlled to prevent destruction of the various components of the system. Use of this destructive component is found as the desirable feature in solar cookers. However, where the collection of and concentration of photonic energy for the purpose of producing high intensity light is concerned, such heat production is a destructive component which must be removed. What is required is a system which will eliminate or substantially remove the infra-red heat producing light while allowing the passage of the visible light. What is further required is the ability to transport the visible light to a location where it can be utilized as an energy source. Filtering enough of the heat producing light component found within the longer light wavelengths may require multiple filtering entities. This is especially true when considering the use of light concentrations above 1000 suns. The use of a solar photon filter at the concentrator input is a solution for which this invention is addressed.

Previous art is found among many U.S. patents related to light filtration methods. One such patent is U.S. Pat. No. 4,229,066 which teaches about a filter which is reflecting at a longer wavelength region and transmitting over a wide band shorter wavelength region, a substrate having a surface, and a coating carried by the surface comprising at least one period which is reflecting at longer wavelengths and transmitting in a wide band of shorter wavelengths. Another patent, U.S. Pat. No. 4,717,227 relates to a solar ray collecting device, of the type in which a large number of lenses having about 4 cm or less in diameter are used, to focus solar rays. Such a device is made up of a heat-conductive support base plate, a large number of hexagonal recess portions, a large number of optical systems installed on each of the recess portions, a large number of heat-conductive protection bars which are set up on the upper vertex of a side wall forming the recess portion, and a protection cover for a light-receiving surface side of the supporting base plate having the function of a filter which is capable of letting visible rays pass through, a pointed end portion of the protection bar being brought into heat-conductive contact with the protection cover. The use of fiber optic bundles and filters is taught in patent U.S. Pat. No. 5,231,461 where a scanning mirror rotates about an axis to sweep successive portions of the earth's terrain past a set of detectors wherein individual ones of the detectors are provided with filters for viewing reflected radiation from the terrain. The calibration system includes a fiber-optic bundle for receiving rays of light from the sun, an output end of the bundle being configured with individual fibers arranged in a line parallel to the mirror rotational axis so as to illuminate the mirror with an input slit of light.

Further examples of previous art in light filter designs are shown in patent U.S. Pat. No. 5,378,892 where an infra-red optical system including imaging optics for transmitting and focusing infra-red light from object space onto an image plane, an infra-red light detector positioned closely proximate to the image plane, a Dewar for cryogenically cooling the detector and an angle filter for restricting the field of view of the detector to a predetermined angle. Another patent, U.S. Pat. No. 6,126,869, teaches about a solar blind optical filter assembly having a class of dye materials which maximizes transmission of target radiation while minimizing transmission of solar or actinic radiation. Also, patent U.S. Pat. No. 6,903,036 further teaches filtration methods using a glass having a composition comprising a dopant as divalent copper oxide having absorption at about 800 nm and infra-red cut capability, a silica skeleton and a vitrification-aiding network modifier oxide and so suitable for vitrification. Thus, the glass of the invention can have excellent infra-red absorption capability and, at the same time, high visible light transmittance as well as chemical endurance and process ability. Another dye induced light filter is found in patent U.S. Pat. No. 6,994,885 where an optical filter is made comprising an organic, solar blind filter dye; and a UV-transparent, non-scattering and chemically stable substrate.

Other approaches to filtering light include patent U.S. Pat. No. 7,149,377 which teaches about the combining of a high-precision Fabry-Perot etalon with a variety of conditioning filters judiciously selected to effectively block completely all radiation except for the spectral line of interest. In addition, a tuning mechanism is provided to precisely control the peak frequency of the filter's output by varying the optical length of the etalon's cavity. The patent U.S. Pat. No. 7,157,159 demonstrates an infra-red ray cut filter comprising: a transparent substrate; and a multi-layer membrane including multiple high-refractive index thin membranes of no less than 16 but no more than 32 layers, wherein: a design wavelength for the thin membrane layers is 750 nm. Beyond filters, precision light manipulation is taught in patent U.S. Pat. No. 6,064,506 where an optical multipath switch having electrically switchable photonic crystals having long miniaturized needles and acting as high-precision optical mirrors with cavities between the needles being filled with nonlinear optical materials or liquid crystals having an orientation so that light hits the optical geometry at a predetermined angle and the light is capable of being coupled in and selectively out via the mirrors. Such previous art provides methods and examples of a variety of ways in which light can be filtered and manipulated to yield expected results. However, no previous art has applied the various methods and techniques of this invention to produce a light manipulating filter for the removal of the heat producing infra-red light component before the light stream is concentrated Unlike methods found among pre art, this invention utilizes a cold mirror system which consists of individual cold mirrors each made of a transparent form or substrate, and one of its surfaces, namely the reflecting surface, consisting of a dielectric interference coating comprised of a series of thin films. The films are of alternate low and high refractive index, compared to that of the substrate, and of optical thickness equal to one quarter of the wavelength of the light for which the longest wavelength of reflectance is required. The cold mirror will have a 90% reflectance of light composed of shorter wavelengths in the visible spectrum. Reflectance rapidly falls off as the wavelength of the light increases beyond the visible waveband. The films and the substrate are effectively transparent to infra-red radiation and hence this radiation is transmitted through them. The required reflected light beam is therefore depleted of nearly 90% of infra-red light or radiation.

Hot mirrors also consist of a transparent form or substrate, and one of its surfaces, namely the reflecting surface, sustains a dielectric interference coating consisting of a series of thin films. The films are of alternate low and high refractive index, compared to that of the substrate, and of optical thickness equal to one quarter of the wavelength of the light for which the shortest wavelength of light is required which, in the case of a hot mirror is in the infra-red region. The hot mirror will have a >80% reflectance of light in the infra-red spectrum. Reflectance rapidly falls off as the wavelength of the light decreases beyond the infra-red waveband. The films and the substrate are effectively transparent to visible light and hence visible light is transmitted through them. The required reflected light beam is therefore depleted of 80% of visible light.

Both hot and cold mirrors can be used for the removal of heat producing infra-red light radiation. The removal depends upon the geometric configuration of the mirror or set of mirrors. When using a cold mirror, non-infra-red visible light is reflected from the mirror. When using a hot mirror, non-infra-red light is transmitted through the mirror.

SUMMARY OF THE INVENTION

The present invention relates to a solar photon filter, hereafter known as the SPF. The SPF is a combination band-pass filtering system consisting of a multiple set of cold mirrors and infra-red absorbers set in a 360-degree arrangement. The system removes almost all of the photons within light having wavelengths longer than 650 nm+/−150 nm while passing most of the incoming photons within light having wavelengths shorter than 650 nm+/−150 nm. This is accomplished by positioning a series of cold mirrors in constant optical track with the sun. Such an assembly of cold mirrors allows solar light to be split into two distinct bands of light frequencies, separating heat producing infra-red with wavelengths longer than 650 nm+/−150 nm from higher light frequencies having wavelengths shorter than 650 nm+/−150 nm and which carry more energetic photons that can be used in photon-to-electron conversion systems. The SPF is, for example, capable of providing infra-red free photons carried by solar light capable of being concentrated for photovoltaic conversion without the thermal effects to system components caused by the heat damaging longer infra-red wavelengths. Such an SPF is extremely useful where high intensity non-filtered light would otherwise damage or destroy optical and other components through thermal reactions.

DESCRIPTION OF THE DRAWINGS

These and other features, aspects and advantages of the present invention will become better understood with regard to the following description and accompanying drawings, where.

DETAILED DESCRIPTION

The SPF system is composed of sub-components which are assembled from mirrors and absorbers available at most optical supply houses. The design can be based on the use of cold mirrors or hot mirrors or both. A cold or hot mirror is a partially reflecting mirror made up of wavelength sensitive laminates on the surface of reflection.

Figure 1:
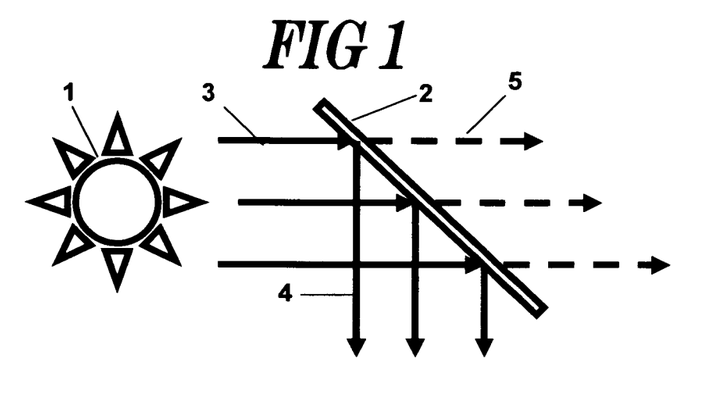
FIG. 1 is a diagram illustrating a cold mirror as it is used to separate solar light into separate bandwidths as used in the embodiment of the present invention.

FIG. 1 is a diagram illustrating a cold mirror 2 as it is used to separate solar light 3 received from the sun 1 into two light paths one of which carries the majority of infra-red light 5 and the other carrying the majority of non-infra-red light 4. Use of a cold mirror requires incoming light 3 to be received by the cold mirror 2 at a 45-degree angle. Of the light that is reflected, 90% contains visible light of shorter wavelengths, in this case shorter than 650 nm+/−150 nm, and 10% contains infra-red light of longer than 650 nm+/−150 nm wavelengths. The inverse is true of light that passes through the cold mirror along the incoming light axis. That is, of the light that is transmitted through, 10% contains visible light of shorter wavelengths, in this case shorter than 650 nm+/−150 nm, and 90% contains infra-red light of longer than 650 nm+/−150 nm wavelengths.

Figure 2:
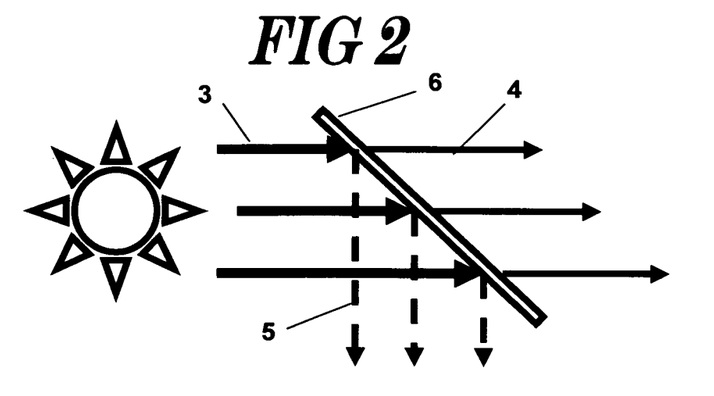
FIG. 2 is a diagram illustrating a hot mirror which is an alternate to a cold mirror that might be used to split solar light into separate bandwidths as used in the embodiment of the present invention.

FIG. 2 is a diagram illustrating a hot mirror 6 as it is used to separate solar light 3 into two light paths one of which carries the majority of infra-red light 5 and the other carrying the majority of non-infra-red light 4. Use of a hot mirror requires incoming light 3 to be received by the hot mirror 6 at a 45-degree angle. Of the light that is reflected, 80% contains infra-red light of longer wavelengths, in this case longer than 650 nm+/−150 nm, and 20% contains visible light of shorter than 650 nm+/−150 nm wavelengths. The inverse is true of light that passes through the hot mirror along the incoming light axis. That is, of the light that is transmitted through, 80% contains visible light of shorter wavelengths, in this case shorter than 650 nm+/−150 nm, and 20% contains infra-red light of longer than 650 nm+/−150 nm wavelengths.

Figure 3:
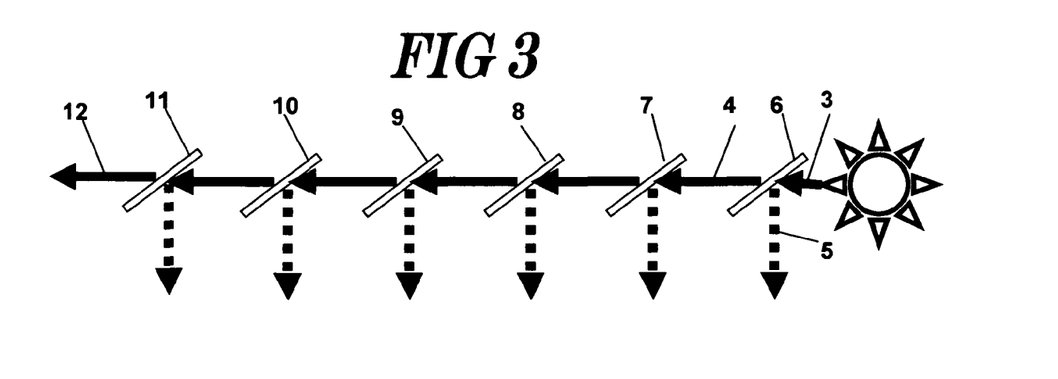
FIG. 3 is a diagram illustrating a hot mirror cascade that might be used to split solar light into separate bandwidths as used in the embodiment of the present invention.

FIG. 3 is a diagram illustrating a hot mirror cascade that might be used to split solar light into separate bandwidths as used in the embodiment of the present invention. Incoming solar light 3 is separated into infra-red light 5 which is reflected away from the cascade while light greatly reduced of its infra-red component 4 passes through to the second hot mirror 7. At this point the process is repeated to the next hot mirror 8 and repeated again through another hot mirror 9, and again through another hot mirror 10, and again through another hot mirror 11 with the result that the final emerging light 12 is clear of almost all of any infra-red light component.

If one were to examine the amount of infra-red light reduction using off-the-shelf hot mirrors as presently available, it will be determined that at each hot mirror junction the amount of infra-red light that is reduced is 80% leaving 20% that passes along with the shorter light wavelengths. The result of this is that after passing through a cascade of six hot mirrors, the amount of light that is still present is as follows:

| Light transmitted Through hot mirror #: | <650 nm +/− 150 nm Short wavelength light: | >650 nm +/− 150 nm Long wavelength light: |
|---|---|---|
| 6 | 0.80 | 0.20 |
| 7 | 0.64 | 0.04 |
| 8 | 0.51 | $0.80 \times 10^{-2}$ |
| 9 | 0.41 | $0.16 \times 10^{-3}$ |
| 10 | 0.33 | $0.32 \times 10^{-4}$ |
| 11 | 0.26 | $0.64 \times 10^{-5}$ |

Thus it can be seen that after a six hot mirror cascade the amount of shorter wavelength light is 26% or $\frac{1}{4}^{th}$ of the amount of the original incoming light while the amount of longer wavelength infra-red is 0.064%.

Figure 4:
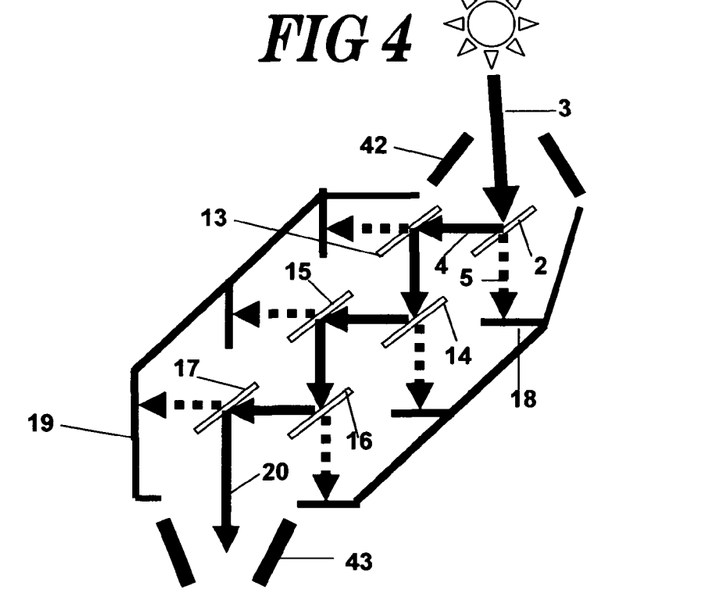
FIG. 4 is a diagram illustrating a cold mirror cascade as it might be used to split solar light into separate bandwidths as used in the embodiment of the present invention.

FIG. 4 is a diagram illustrating a cold mirror cascade as it might be used to split solar light into separate bandwidths as used in the embodiment of the present invention. Incoming solar light 3 passes through a surrounding housing input port 42 and is separated into infra-red light 5 which passes through the first cold mirror 2 and away from the cascade to an infra-red absorber 18 while light greatly reduced of its infra-red component 4 is reflected to the second cold mirror 13. At this point the process is repeated to the next cold mirror 14 and repeated again through another cold mirror 15, and again through another cold mirror 16, and again through another cold mirror 17. This final cold mirror 17 passes 90% of all remaining infra-red light to an infra-red absorber 19 while reflecting light 20, composed of 90% of shortwave visible light and 10% of longwave infra-red light, through a surrounding housing output port 43.

If one were to examine the amount of infra-red light reduction using off-the-shelf cold mirrors as presently available, it will be determined that at each cold mirror junction the amount of infra-red light that is reduced is 90% leaving 10% that passes along with the shorter light wavelengths. The result of this is that after passing through a cascade series of reflections via six cold mirrors, the amount of the light that is still present is as follows:

| Light transmitted Through cold mirror #: | <650 nm +/− 150 nm Short wavelength light: | >650 nm +/− 150 nm Long wavelength light: |
|---|---|---|
| 2  | .90 | .10 |
| 13 | .81 | .01 |
| 14 | .73 | $1.0 \times 10^{-3}$ |
| 15 | .66 | $1.0 \times 10^{-4}$ |
| 16 | .59 | $1.0 \times 10^{-5}$ |
| 17 | .53 | $1.0 \times 10^{-6}$ |

Thus it can be seen that after a six cold mirror pass the amount of shorter wavelength light is 53% or one-half of the original incoming light while the amount of longer wavelength infra-red is 0.001% or one-millionth of the original incoming light.

If the light emerging from either cascade must be concentrated, the choice between a hot and cold cascade is obvious. Until such time as available hot mirror technology can provide an equal separation scenario to that of the cold mirror technology, the preferred embodiment is for a cold mirror cascade system.

Figure 5:
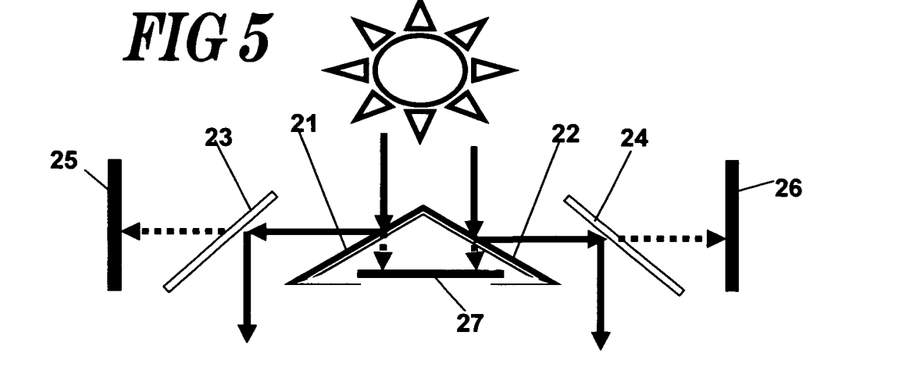
FIG. 5 is a diagram illustrating a two reflection cold mirror assembly as it might be used in the embodiment of the present invention.

FIG. 5 is a diagram illustrating a two-reflection four cold mirror assembly as it might be used in the embodiment of the present invention demonstrating absorption of the longer wavelength infra-red light. Two first cold mirrors are situated opposite to each other in this arrangement and are displayed as side one 21 and side two 22 of a triangle-like arrangement. One of the first cold mirrors 21 passes 90% of the longer wavelength infra-red through to an infra-red absorber 27. The same cold mirror reflects 90% of the shorter wavelength light onto a second cold mirror 23 which passes any remaining infra-red light through to an infra-red absorber 25 while reflecting the less infra-red containing visible light of shorter wavelength. Likewise, another first cold mirror 22 accomplishes the same thing with another second cold mirror 24 and its associated infra-red absorber 26. The resulting light output is calculated to contain 81% of the shorter wavelength light and 1% of the longer wavelength light from the incoming light.

Figure 6:
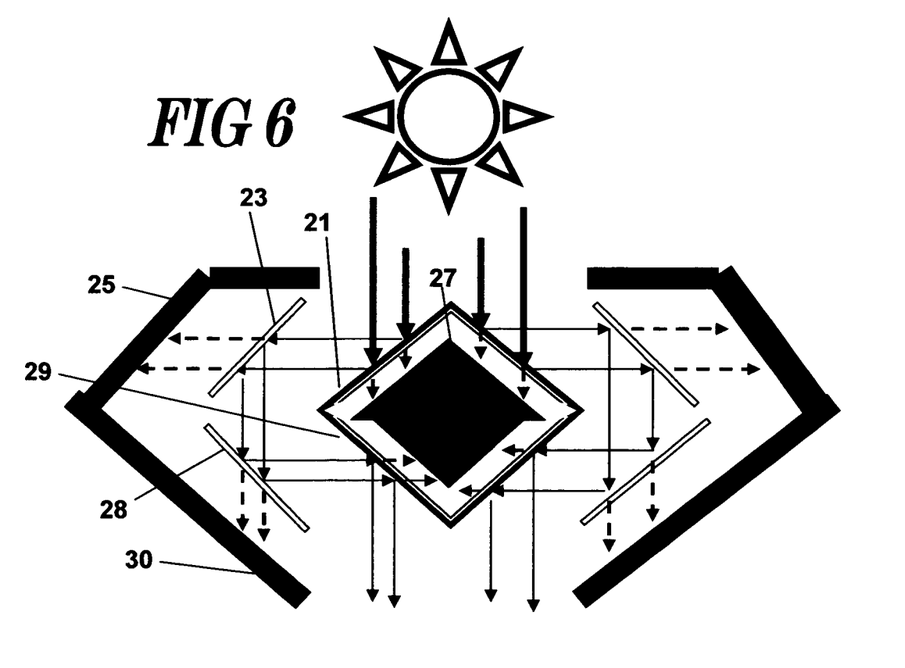
FIG. 6 is a diagram illustrating a four reflection cold mirror assembly as it might be used in the embodiment of the present invention.

FIG. 6 is a diagram illustrating a four reflection cold mirror assembly as it might be used in the embodiment of the present invention. Additional light filtering is accomplished by adding an additional two-reflection four cold mirror assembly to that illustrated in FIG. 5. The additional assembly appears as a mirror-like reflection showing how the actual mirrors are to be arranged. Infra-red light absorption is demonstrated in this arrangement. Infra-red light is removed from incoming light and is passed through the first cold mirror 21 to a central infra-red absorber 27. The reflected light of first cold mirror 21 contains 90% shorter wavelength light plus 10% infra-red light and is passed on to the second cold mirror 23. Of this light, 90% of the infra-red light that reaches the second cold mirror passes through to an infra-red absorber 25. The second cold mirror 23 reflects 90% of the light hitting its surface and 10% of the infra-red light onto a third cold mirror 28. Of this light, 90% of the infra-red light that reaches the third cold mirror 28 passes through to an infra-red absorber 30. The third cold mirror 28 reflects 90% of the light hitting its surface and 10% of the infra-red light onto a fourth cold mirror 29. Of this light, 90% of the infra-red light that reaches the fourth cold mirror 29 passes through to an infra-red absorber 27 while 90% of the shorter wavelength light plus 10% of the infra-red light hitting its surface is reflected away from the system. The resulting light output is calculated to contain 66% of the shorter wavelength light and 0.01% of the longer wavelength light from the incoming light.

Figure 7:
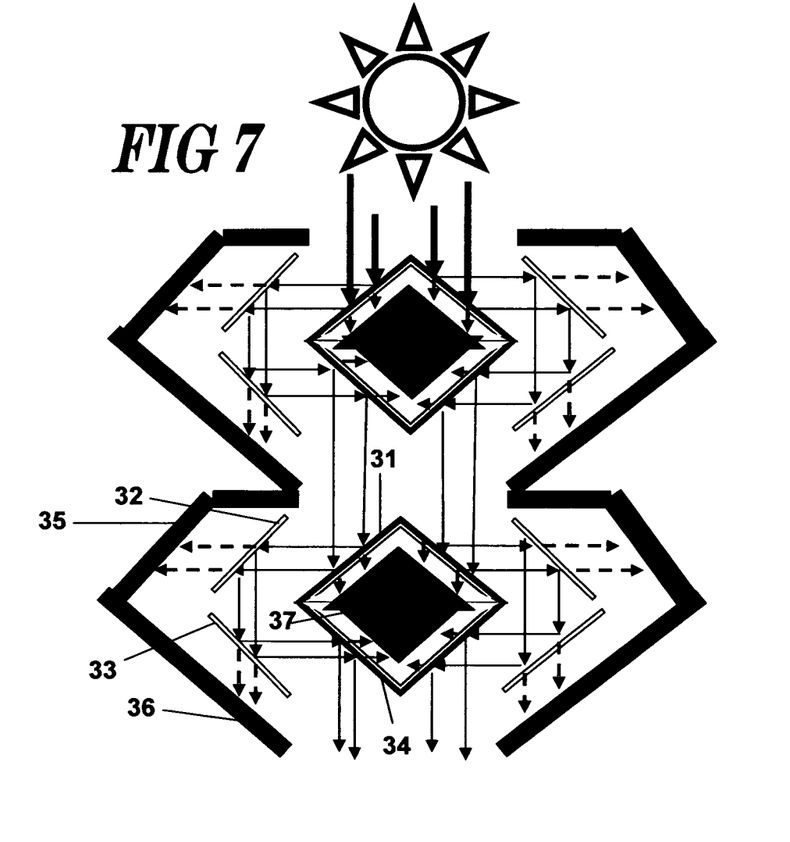
FIG. 7 is a diagram illustrating an eight reflection cold mirror assembly as it might be used in the embodiment of the present invention.

FIG. 7 is a diagram illustrating an eight reflection cold mirror assembly as it might be used in the embodiment of the present invention. This model is essentially a double of that illustrated in FIG. 6 placed in vertical fashion. Light exiting the first assembly of four mirrors enters a fifth cold mirror 31 where 90% of any infra-red light passes through onto an infra-red absorber 37. All reflected light is directed toward a sixth cold mirror 32 which then passes through 90% of any infra-red light to an infra-red absorber 35. Reflected light from the sixth cold mirror 32 is directed toward a seventh cold mirror 33 which passes 90% of any remaining infra-red light to an infra-red absorber 36. The light reflected from the seventh cold mirror 33 surface is directed to an eight cold mirror 34 which passes 90% of any remaining infra-red light to an infra-red absorber 37. The light reflected from the eighth and final cold mirror 34 is directed out and away from the entire assembly for use by a light concentrator. The resulting light output is calculated to contain 53% of the incoming light as shorter wavelength light and 0.0001% of the incoming light as longer wavelength light.

Light emerging from the SPF, solar photon filter, can be sent to a light concentrator for distribution. A 1-meter parabolic light concentrator receiving a full 1-meter square area of light would concentrate this light to a level of about 130 dB. Since the concentration includes all light from the SPF, it is of vital importance that any longer wavelength light having infra-red heat generating capability be as minimal as possible. With this light equivalent to 0.5 sun of shorter wavelength light with 0.000001 sun of longer wavelength light the resultant distribution light equates to an intensity of over 500,000 suns of short-wavelength light while also carrying only 1 sun of infra-red light. Thus the thermal reaction of system components in a distribution system need only tolerate 1 sun of infra-red thermal energy.

Figure 8:
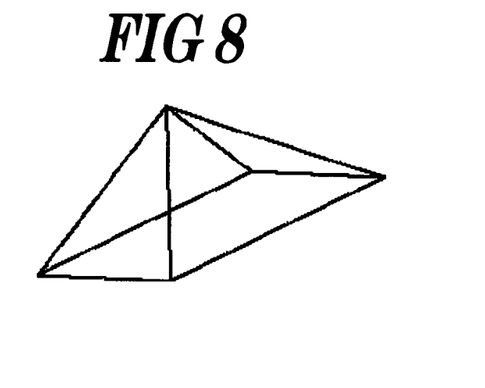
FIG. 8 is a 3D orthographic view illustrating a four reflection cold mirror assembly as it might be used in the embodiment of the present invention.

FIG. 8 is a 3D orthographic view illustrating four single reflection cold mirrors in a 360-degree assembly as it might be used in the embodiment of the present invention.

Figure 9:
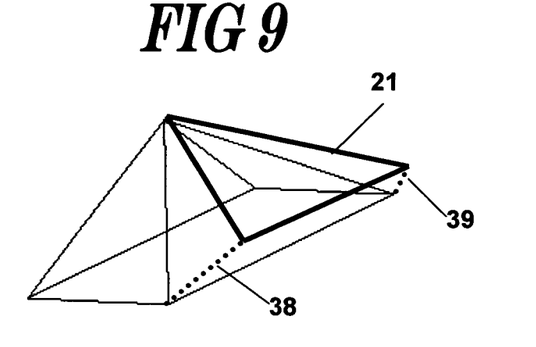
FIG. 9 is a 3D orthographic view illustrating a four reflection cold mirror assembly highlighting one of several inner cold mirrors and method of mirror alignment as it might be used in the embodiment of the present invention.

FIG. 9 is a 3D orthographic view illustrating the assembly of FIG. 8 with the addition of one of the cold mirrors 21 demonstrating how it would be aligned using a left alignment leg 38 and a right alignment leg 39 for precise mirror adjustment as it might be used in the embodiment of the present invention.

Figure 10:
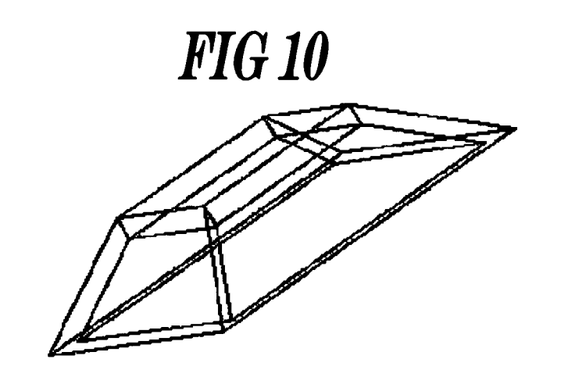
FIG. 10 is a 3D orthographic view illustrating the outer four reflection surfaces of the assembly of cold mirrors as it might be used in the embodiment of the present invention.

FIG. 10 is a 3D orthographic view illustrating the outer four reflection surfaces of the assembly of cold mirrors as it might be used in the embodiment of the present invention.

Figure 11:
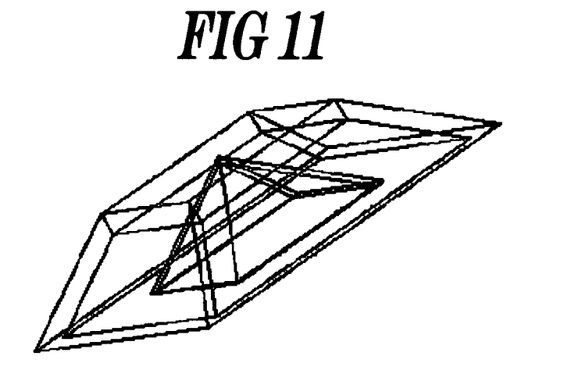
FIG. 11 is a 3D orthographic view illustrating the inner and outer reflection assembly of four inner and four outer cold mirrors as they might be used in the embodiment of the present invention.

FIG. 11 is a 3D orthographic view illustrating the inner and outer reflection assembly of four inner and four outer cold mirrors as they might be used in the embodiment of the present invention.

Figure 12:
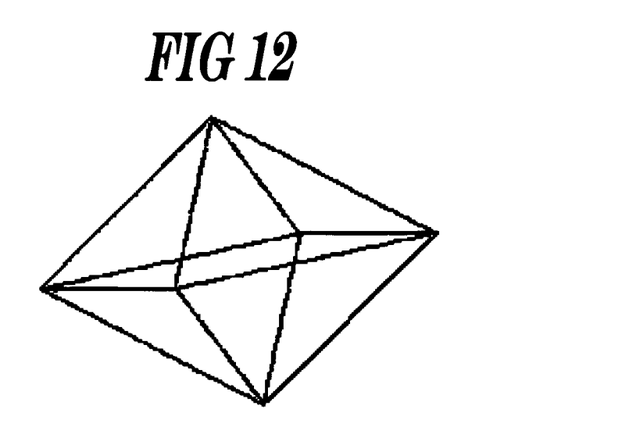
FIG. 12 is a 3D orthographic view illustrating the inner reflection assembly of eight cold mirrors as they might be used in the embodiment of the present invention.

FIG. 12 is a 3D orthographic view illustrating the inner reflection assembly of eight cold mirrors as they might be used in the embodiment of the present invention.

Figure 13:
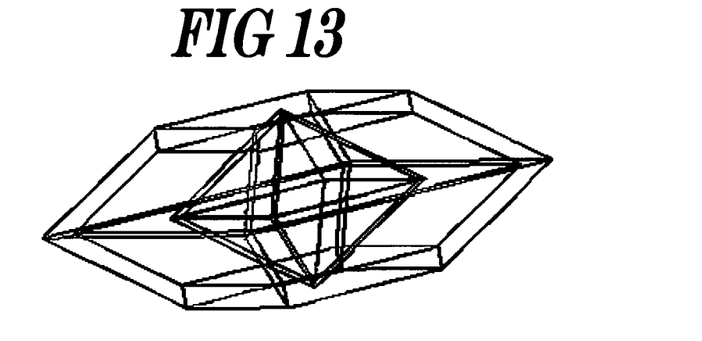
FIG. 13 is a 3D orthographic view illustrating the inner and outer reflection assembly of eight inner and eight outer cold mirrors as they might be used in the embodiment of the present invention.

FIG. 13 is a 3D orthographic view illustrating the inner and outer reflection assembly of eight inner and eight outer cold mirrors as they might be used in the embodiment of the present invention.

Figure 14:
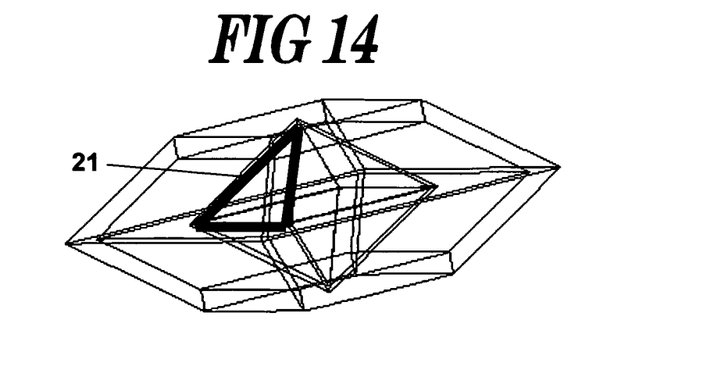
FIG. 14 is a 3D orthographic view illustrating the inner and outer reflection assembly of eight inner and eight outer cold mirrors as they might be used in the embodiment of the present invention highlighting one of several inner Cold mirrors.

FIG. 14 is a 3D orthographic view illustrating the inner and outer reflection assembly of eight inner and eight outer cold mirrors as they might be used in the embodiment of the present invention highlighting one of several inner Cold mirrors 21.

Figure 15:
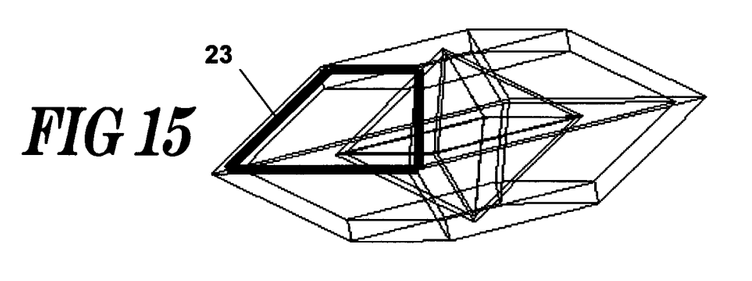
FIG. 15 is a 3D orthographic view illustrating the inner and outer reflection assembly of eight inner and eight outer cold mirrors as they might be used in the embodiment of the present invention highlighting one of several outer Cold mirrors.

FIG. 15 is a 3D orthographic view illustrating the inner and outer reflection assembly of eight inner and eight outer cold mirrors as they might be used in the embodiment of the present invention highlighting one of several outer Cold mirrors 23.

Figure 16:
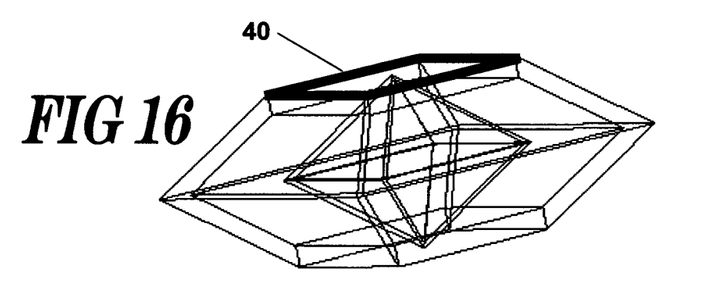
FIG. 16 is a 3D orthographic view illustrating the inner and outer reflection assembly of eight inner and eight outer cold mirrors as they might be used in the embodiment of the present invention highlighting the upper opening for light input.

FIG. 16 is a 3D orthographic view illustrating the inner and outer reflection assembly of eight inner and eight outer cold mirrors as they might be used in the embodiment of the present invention highlighting the upper assembly opening 40 for light input.

Figure 17:
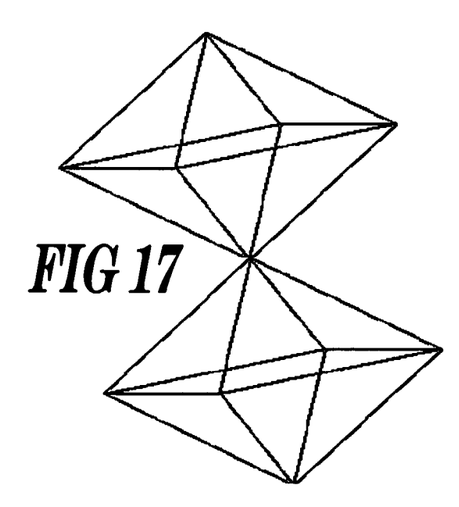
FIG. 17 is a 3D orthographic view illustrating the inner reflection assembly of dual eight (sixteen) cold mirrors as they might be used in the embodiment of the present invention.

FIG. 17 is a 3D orthographic view illustrating the inner reflection assembly of dual eight (sixteen) cold mirrors as they might be used in the embodiment of the present invention.

Figure 18:
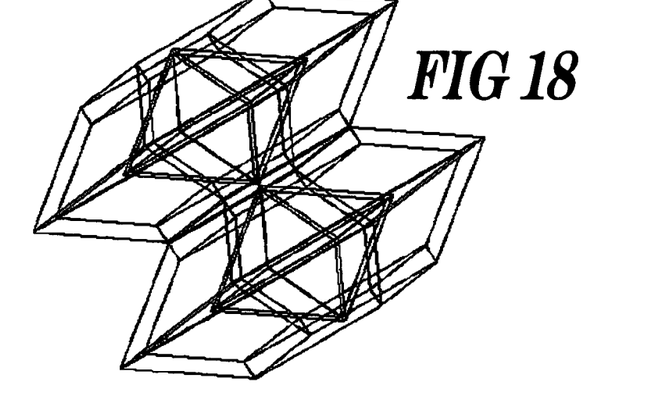
FIG. 18 is a 3D orthographic view illustrating the inner and outer reflection assembly of dual eight (sixteen) inner and dual eight (sixteen) outer cold mirrors as they might be used in the embodiment of the present invention.

FIG. 18 is a 3D orthographic view illustrating the inner and outer reflection assembly of dual eight (sixteen) inner and dual eight (sixteen) outer cold mirrors as they might be used in the embodiment of the present invention.

Figure 19:
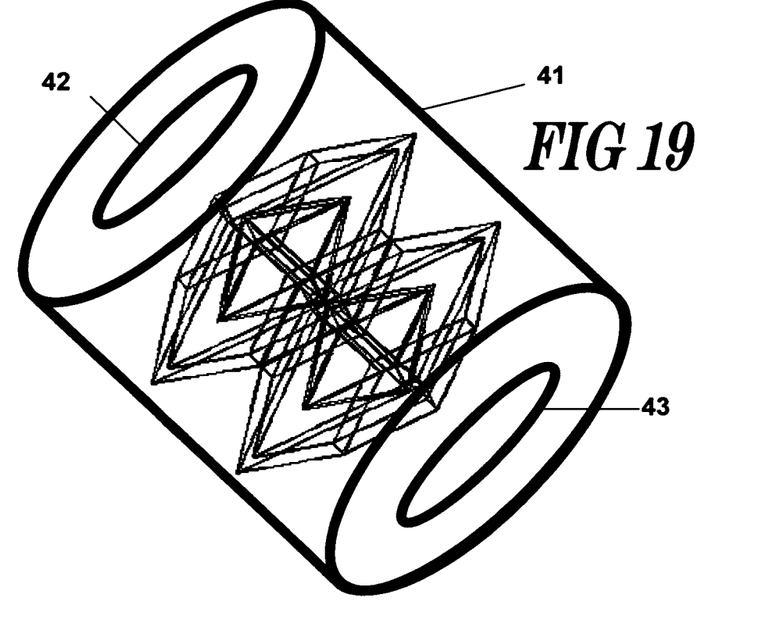
FIG. 19 is a 3D orthographic view illustrating the inner and outer reflection assembly of dual eight (sixteen) inner and dual eight (sixteen) outer cold mirrors within an environmentally protective housing having inner infra-red absorbing walls as might be used in the embodiment of the present invention.

FIG. 19 is a 3D orthographic view illustrating the inner and outer reflection assembly of dual eight (sixteen) inner and dual eight (sixteen) outer cold mirrors within an environmentally protective housing 41 having a light input opening 42 consisting of an optically clear and full bandwidth passing environmentally protecting window, and a light output opening 43 with or without said window as might be used in the embodiment of the present invention.

| REFERENCES CITED | | | |
| --- | --- | --- | --- |
| 4,229,066 | October, 1980 | Rancourt et al. | 350/1.6 |
| 4,717,227 | January, 1988 | Mori | 350/96.10 |
| 5,231,461 | July, 1993 | Silvergate et al. | 356/326 |
| 5,378,892 | January, 1995 | Levy et al. | 250/352 |
| 6,064,506 | May, 2000 | Koops | 359/237 |
| 6,126,869 | October, 2000 | Haaland | 252/589 |
| 6,903,036 | June, 2005 | Akimoto et al. | 501/12 |

| -continued | | | |
| --- | --- | --- | --- |
| REFERENCES CITED | | | |
| 6,994,885 | February, 2006 | Pong et al. | 427/162 |
| 7,149,377 | December, 2006 | Sidorin et al. | 385/15 |
| 7,157,159 | January, 2007 | Kondo | 428/699 |

What is claimed is:

1. A combination band-pass filtering system consisting of a multiple set of cold mirrors and infra-red absorbers set in a 360-degree cascade arrangement for the purpose of limiting and re-directing photons of selected wavelengths and composed of:

an input port accepting solar light photons of undetermined wavelengths;

an output port allowing the exit of non-focused said light photons of selected wavelengths;

a first cascaded set of triangular cold mirrors each composed of a plane reflective surface positioned 45-degrees to the axis of light entering at said input port;

a second cascaded set of cold mirrors each composed of a plane reflective surface positioned a distance, with axis at 45-degrees to reflected light, from said first cascaded set of cold mirrors;

a third cascaded set of cold mirrors each composed of a plane reflective surface with axis at 45-degrees to reflected light from said second cascaded set of outer cold mirrors;

a fourth cascaded set of triangular cold mirrors each composed of a plane reflective surface, positioned 45-degrees to light received from said third set of outer cold mirrors and with reflected light toward said output port.

2. The system of claim 1 wherein the said first cascaded set of cold mirrors pass photons within light having wavelengths longer than 650 nm.+/−.150 nm to said infra-red absorbers and reflect or re-direct photons within light having wavelengths shorter than 650 nm.+/−.150 nm, to the set of second cascaded cold mirrors.

3. The system of claim 1 wherein the said second cascaded set of cold mirrors pass photons within light having wavelengths longer than 650 nm.+/−.150 nm. to said infra-red absorbers and reflect or re-direct photons within light having wavelengths shorter than 650 nm.+/−150 nm, to the said third cascaded set of cold mirrors.

4. The system of claim 1 wherein the said third cascaded set of cold mirrors pass photons within light having wavelengths longer than 650 nm.+/−150 nm. to said infra-red absorbers and reflect or re-direct photons within light having wavelengths shorter than 650 nm.+/−150 nm. to said fourth cascaded set of cold mirrors.

5. The system of claim 1 wherein the said fourth cascaded set of cold mirrors pass photons within light having wavelengths longer than 650 nm.+/−150 nm. to said infra-red absorbers and reflect or re-direct photons within light having wavelengths shorter than 650 nm.+/−150 nm. to said output port.

6. The system of claim 1 wherein the said infra-red absorbers are designed to allow thru put and/or absorb photons of wavelengths longer than 650 nm.+/−150 nm.

* * * * *